United States Patent
Putnam et al.

(10) Patent No.: US 6,249,624 B1
(45) Date of Patent: Jun. 19, 2001

(54) METHOD AND APPARATUS FOR FORMING A BRAGG GRATING WITH HIGH INTENSITY LIGHT

(75) Inventors: Martin A. Putnam, Middletown; Robert N. Brucato, Waterbury, both of CT (US)

(73) Assignee: CiDRA Corporation, Wallingford, CT (US)

( * ) Notice: Subject to any disclaimer, the term of this patent is extended or adjusted under 35 U.S.C. 154(b) by 0 days.

(21) Appl. No.: 09/206,171

(22) Filed: Dec. 4, 1998

(51) Int. Cl.$^7$ .................................................. G02B 6/34
(52) U.S. Cl. ......................................................... 385/37
(58) Field of Search .............................. 385/37, 123, 31, 385/128

(56) References Cited

U.S. PATENT DOCUMENTS

| | | | |
|---|---|---|---|
| 4,636,031 | 1/1987 | Schmadel, Jr. et al. | 350/96.19 |
| 4,725,110 | * 2/1988 | Glenn et al. | 350/3.61 |
| 4,915,467 | 4/1990 | Berkey | 350/96.15 |
| 5,007,705 | 4/1991 | Morey et al. | 350/96.29 |
| 5,042,898 | 8/1991 | Morey et al. | 385/37 |
| 5,235,659 | 8/1993 | Atkins et al. | 385/124 |
| 5,388,173 | 2/1995 | Glenn | 385/37 |
| 5,399,854 | 3/1995 | Dunphy et al. | 250/227.17 |
| 5,469,520 | 11/1995 | Morey et al. | 385/37 |
| 5,512,078 | 4/1996 | Griffin | 65/484 |
| 5,574,810 | * 11/1996 | Byron et al. | 385/37 |
| 5,578,106 | 11/1996 | Fleming, Jr. et al. | 65/391 |
| 5,680,412 | 10/1997 | DeMaria et al. | 372/92 |
| 5,682,453 | * 10/1997 | Daniel et al. | 385/99 |
| 5,684,297 | 11/1997 | Cable | 250/227.14 |
| 5,691,999 | 11/1997 | Ball et al. | 373/20 |
| 5,719,974 | * 2/1998 | Kashyap | 385/37 |
| 5,745,626 | 4/1998 | Duck et al. | 385/96 |
| 5,841,131 | 11/1998 | Schroeder et al. | 250/227.17 |
| 5,953,472 | * 9/1999 | Boschis et al. | 385/37 |
| 6,005,877 | * 12/1999 | Gaeta et al. | 372/6 |
| 6,160,935 | * 12/2000 | Gaeta et al. | 385/37 |

FOREIGN PATENT DOCUMENTS 0359351   9/1992   (EP) .............................. C03B/37/15

OTHER PUBLICATIONS

Title: "100% Reflectivity Bragg Reflectors Produced in Optical Fibres by Single Excimer Laser Pulses", Author(s): J.L. Archambault, L. Reekie and P. St. J. Russell, cited in: Electronics Letters, GB, IEEE Stevenage, vol. 29, No. 5, Mar. 4, 1993, pp. 453–455, XP000350820.

(List continued on next page.)

Primary Examiner—Frank G. Font
Assistant Examiner—Phil Natividad

(57) ABSTRACT

A method and apparatus for forming a Bragg grating using a high intensity light includes a pair of focussed writing beams 26,34 that simultaneously intersect and interfere with each other at a region 30 of a photosensitive optical fiber 28. The beams 26,34 have a high intensity (e.g., at least about 500 mjoules/cm$^2$) and pass through an interface medium 50 that is substantially transparent to the wavelength of the writing beams 26,34. The medium has a thickness T set such that the intensity of the beams at the surface 56 of the medium 50 is below an surface damage intensity such that no ablations occur on the fiber 28 or the surface 56 when the fiber 28 is exposed to the beams 26,34.

22 Claims, 2 Drawing Sheets

OTHER PUBLICATIONS

Title: "Fibre Strength Unaffected by On–Line Writing of Single–Pulse Bragg Gratings", Author(s): D.S. Starodubov, V. Grubsky & J. Feinberg, cited in Electronics Letters, GB, IEE Stevenage, vol. 33, No. 15, Jul. 17, 1997, pp. 1333–1334, XP000734238.

Title: "Fundamental–Transverse–Mode High–Power AlGaInP Laser Diode with Windows Grown on Facets", Author(s): Masanori Watanabe et al., cited in IEEE Journal of Selected Topics in Quantum Electronics, US, IEEE Service Center, vol. 1, No. 2 Jun. 1, 1995, pp. 728–733, XP000521131.

M.G. Xu, . Geiger and J. P. Dakin for "Fibre grating pressure sensor with enhanced sensitivity using a glass–bubble housing"—Electronics Letters—18$^{th}$ Jan. 1996 vol. 32, No. 2.

Quartzdyne, Inc., Series QU/QG Spec Specification Sheet and p. 6, Section 1, General Information taken from Quartzdyne Pressure Transducers General Catalog and Operating Manual for Quartzdyne Downhole High Pressure Transducers (Series QU, QG, QL, TMC, 1XP and LP) Apr. 1, 1997.

"The Thickness–Shear Quartz Resonator: A Rugged, Precision Pressure Transducer" Product Feature from SENSORS, Jul. 1990.

* cited by examiner

METHOD AND APPARATUS FOR FORMING A BRAGG GRATING WITH HIGH INTENSITY LIGHT

CROSS REFERENCES TO RELATED APPLICATIONS

Copending U.S. patent applications, Ser. No. 09/205,845, entitled "Method and Apparatus For Forming A Tube-Encased Bragg Grating" filed contemporaneously herewith, contains subject matter related to that disclosed herein.

TECHNICAL FIELD

This invention relates to fiber Bragg gratings, and more particularly to forming a Bragg grating with high-intensity light.

BACKGROUND ART

It is known in the art of fiber optics that Bragg gratings (i.e., periodic or aperiodic variations in the refractive index of the optical fiber) exhibit a predetermined wavelength reflection profile. As is known, a fiber Bragg grating is the result of a photo-refractive effect. In particular, when the core of a photosensitive (e.g., germania-doped) optical fiber is exposed to ultra-violet radiation in a predetermined wavelength range, a permanent change in the refractive index is produced. The magnitude of the refractive index change is related to the intensity of the incident radiation and the time of exposure.

As is also known, a Bragg grating is impressed (or embedded or written or imprinted) into the core of an optical fiber by allowing two coherent nominally plane optical waves to interfere within the fiber core at a location along the fiber where the grating is desired. The resulting interference pattern is a standing wave which exists along the longitudinal axis of the fiber having an intensity variation which causes a corresponding spatially periodic or aperiodic variation in refractive index along the longitudinal axis of the fiber. For periodic variations, the grating has a peak reflection wavelength related to twice the spatial period (or grating spacing). The spatial periodicity or other spatial variations of the refractive index of the fiber, and the resultant reflectivity profile, are a function of the wavelength, amplitude, and/or phase of the two incident writing beams and/or their angle of intersection within the fiber.

The above described techniques are described in U.S. Pat. Nos. 4,807,950 and 4,725,110, entitled "Method for Impressing Gratings Within Fiber Optics", both to Glenn et al and U.S. Pat. No. 5,388,173, entitled "Method and Apparatus for Forming Aperiodic Gratings in Optical Fibers", to Glenn, which are hereby incorporated by reference.

For some applications, it is desirable to write a grating with a high intensity interference pattern. For example, a standard grating or "Type 1" grating, is typically written with either a standard intensity (about 50–500 mjoules/cm$^2$) or high intensity (about 500–800 mjoules/cm$^2$) light. For a Type 1 grating, the higher the intensity of the light, the faster the grating is written and, in general, the higher the resultant reflectivity. Also, a high temperature grating or "Type 2" grating is written with very high light intensities (about 0.9–1.5 joules/cm$^2$ or higher), such as is discussed in J. L. Archambault et al., "100% Reflectivity Bragg Reflectors produced in Optical Fibers by Single Excimer Laser Pulses", Electronics Letters 29(1993) pp 453–455. However, with a high intensity light (e.g., greater than about 800 mjoules/cm$^2$ for average surface quality glass), the electric field at the air-to-glass interface at the surface of the fiber would be so high that it would cause ablations (i.e., melting, evaporation, or particle discharge) at the surface of the fiber which cause damage to the outer surface of the fiber and reduce the tensile strength of the fiber. The maximum intensity depends on the glass surface quality, e.g., the amount of contamination, such as dust, dirt, oils, etc. Thus, for poor surface quality glass the maximum intensity may be lower than 800 mjoules/cm$^2$ (e.g., 500 mjoules/cm$^2$ or lower). The cleaner the glass, the higher the intensity that the glass can withstand before surface damage occurs. Thus, it would be desirable to be able to write gratings with such high intensity light without damaging the fiber outer surface.

SUMMARY OF THE INVENTION

Objects of the present invention include provision of a method and apparatus for writing a Bragg grating into an optical fiber with a high intensity light without damaging the surface of the fiber.

According to the present invention, an apparatus for impressing a grating in an optical waveguide, comprises a photosensitive optical waveguide; an interface medium, disposed adjacent to the waveguide; means for providing a pair of focussed writing beams having a predetermined wavelength capable of writing a Bragg grating in the waveguide; the writing beams being incident on a surface of and passing through a portion of the interface medium, and the beams intersecting and interfering at a predetermined region of the waveguide; the surface of the interface medium being optically flat; and the writing beams having an intensity at the fiber of greater than a predetermined high intensity and the medium having a predetermined thickness such that the intensity sufficient to cause surface damage to said waveguide in the absence of said medium of the writing beams at the surface of the medium is less than a predetermined surface damage intensity such that surface damage does not occur on the medium and on the fiber when the writing beams are writing the grating.

According further to the present invention, an intermediate material is disposed between the medium and the waveguide. According to the present invention, the intermediate material is substantially transparent to the wavelength of the writing beams. According to the present invention, the intermediate material has a refractive index that substantially matches the refractive index of the waveguide and the interface medium. According to the present invention, the intermediate material comprises an oil. According further to the present invention, each of the writing beams is focussed to a line near the waveguide. According further to the present invention, the waveguide comprises an optical fiber.

The present invention provides a method and apparatus for writing a Bragg grating using a high intensity interference pattern in the fiber. In particular, the invention eliminates ablations that typically occur on the surface of the optical fiber when high intensity beams interfere to form a high intensity interference pattern. The invention uses a UV transparent interface medium (e.g., a glass block with a hole or a slit in it, or collar) adjacent to and contiguous with the outer surface of the fiber, which positions the air-to-glass interface at a predetermined distance from the focal point (or line) of the writing beams such that the intensity of the writing beams at the air-to-glass interface is low enough to not cause damage to the surface of the glass. A substantially index-matching transparent oil or gel may be used between the fiber and the medium to insure no air-to-glass interface exists at the surface of the fiber. If desired, the fiber may be hydrogen loaded prior to writing the grating to provide higher reflectivity and/or faster writing time.

The foregoing and other objects, features and advantages of the present invention will become more apparent in light of the following detailed description of exemplary embodiments thereof.

BEST MODE FOR CARRYING OUT THE INVENTION

Figure 1:
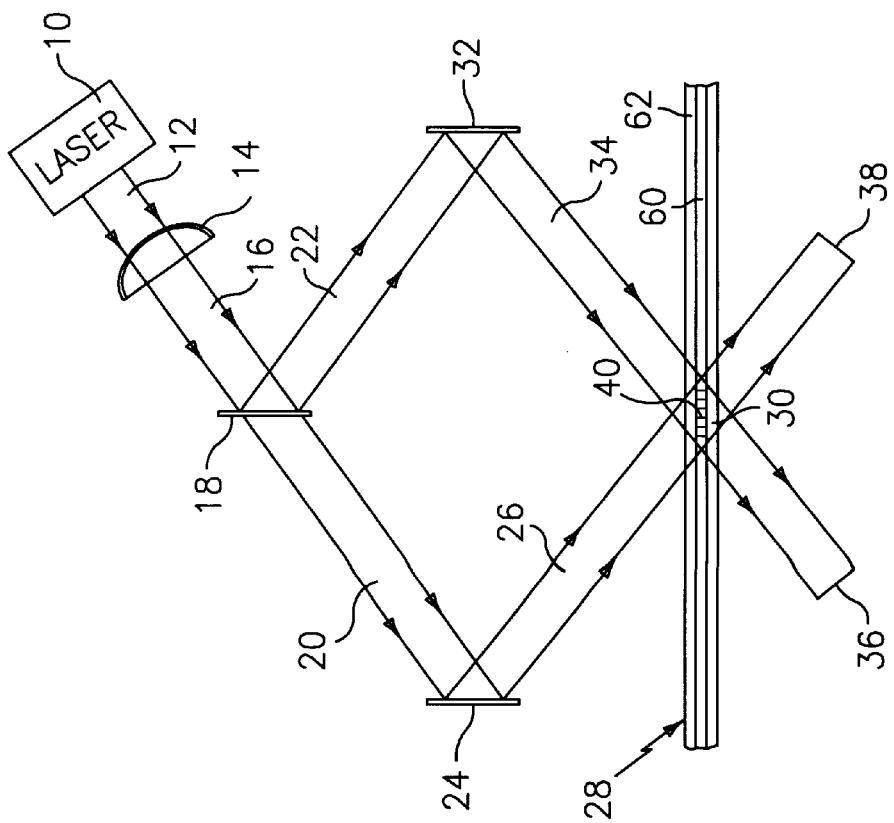
FIG. 1 is a block diagram of a prior art configuration for writing a grating in an optical fiber.

Referring to FIG. 1, a prior art configuration for writing a Bragg grating 40 in an optical fiber 28 comprises a laser source 10 (e.g., a pulsed or continuous wave laser) which provides a source beam 12 having a wavelength in the Ultra-Violet (UV) range (e.g., about 193 to 330 nanometers) which is incident on a cylindrical focussing lens 14 which provides a beam 16. The beam 16 is incident on a beam-splitter 18 which passes a predetermined percentage (e.g., 50%) of the input light 16 as a passed light 20 and reflects the remaining portion as a reflected light 22. The passed light 20 is incident on a mirror 24 which provides a reflected writing beam 26. The writing beam 26 is incident on a region 30 of a photosensitive optical fiber 28, e.g., a germania-doped silica-core fiber. The reflected beam 22 is incident on a mirror 32 which provides a reflected writing beam 34. The writing beam 34 is also incident on the region 30 of the optical fiber 28. The beams 26,34 intersect and interfere in the region 30 of the fiber 28 to form a standing wave interference pattern along the longitudinal axis of the fiber 28 in the region 30 having a predetermined intensity variation which causes a corresponding permanent variation in refractive index of the core of the fiber 28 (i.e., a Bragg grating 40), as described hereinbefore and in the aforementioned U.S. Pat. Nos. 4,807,950, 4,725,110, and 5,388,173. Other techniques and equipment may be used to create the two coherent writing beams 26,34.

For periodic variations, the grating 40 has a peak reflection wavelength related to twice the spatial period (or grating spacing). The spatial periodicity or other spatial variations of the refractive index of the fiber 28, and the resultant reflectivity profile, are a function of the wavelength, amplitude (or intensity), and/or phase of the two incident beams 26,34 and/or their angle of intersection within the fiber 28.

The fiber 28 may be any optical fiber or waveguide that is photosensitive and guides propagating light, e.g., a single mode, germania-doped silica core fiber having an outer cladding 62 diameter of about 125 microns and an core 60 outer diameter of about 9 microns. Other materials and dimensions for the optical fiber or waveguide 10 may be used if desired. For example, the fiber 10 may be made of any glass, e.g., silica, phosphate glass, or other glasses, or made of glass and plastic, or solely plastic. Also, the fiber 10 may have an outer diameter of 80 microns or other diameters. Further, instead of an optical fiber, any optical waveguide may be used that is photosensitive (i.e., a waveguide made of a material that has a refractive index that can be changed by exposure to light of a predetermined wavelength at a predetermined intensity). Also, a multi-mode, birefringent, polarization maintaining, polarizing, multi-core, multi-cladding optical waveguide, or a flat or planar waveguide (where the waveguide is rectangular shaped), or other optical waveguide may be used if desired. As used herein the term "fiber" includes the above described waveguides.

The cylindrical lens 14 focuses the beams 16,20,26 to a line 36 and the beams 16,22,34 to a line 38. Typically, the focal lines 36,38 are a sufficient distance from the fiber 28 (e.g., 2.5 inches for a 300 mjoules/cm$^2$ intensity beam) to prevent the intensity of the writing beams 26,34 from being so high as to cause ablations in the fiber 28.

As discussed hereinbefore, if the writing beams 26,34 have a high intensity in the interference writing region 30 of the fiber 20, ablations or damage to the fiber results.

Figure 2:
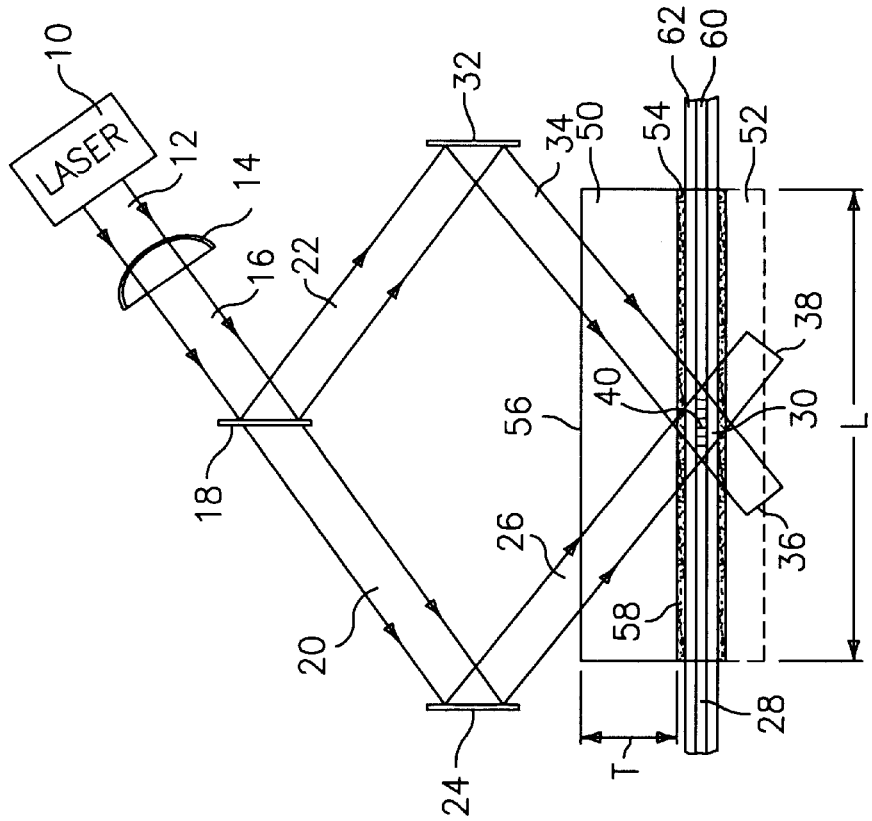
FIG. 2 is a block diagram of a configuration for writing a grating through an interface medium, in accordance with the present invention.
Figure 3:
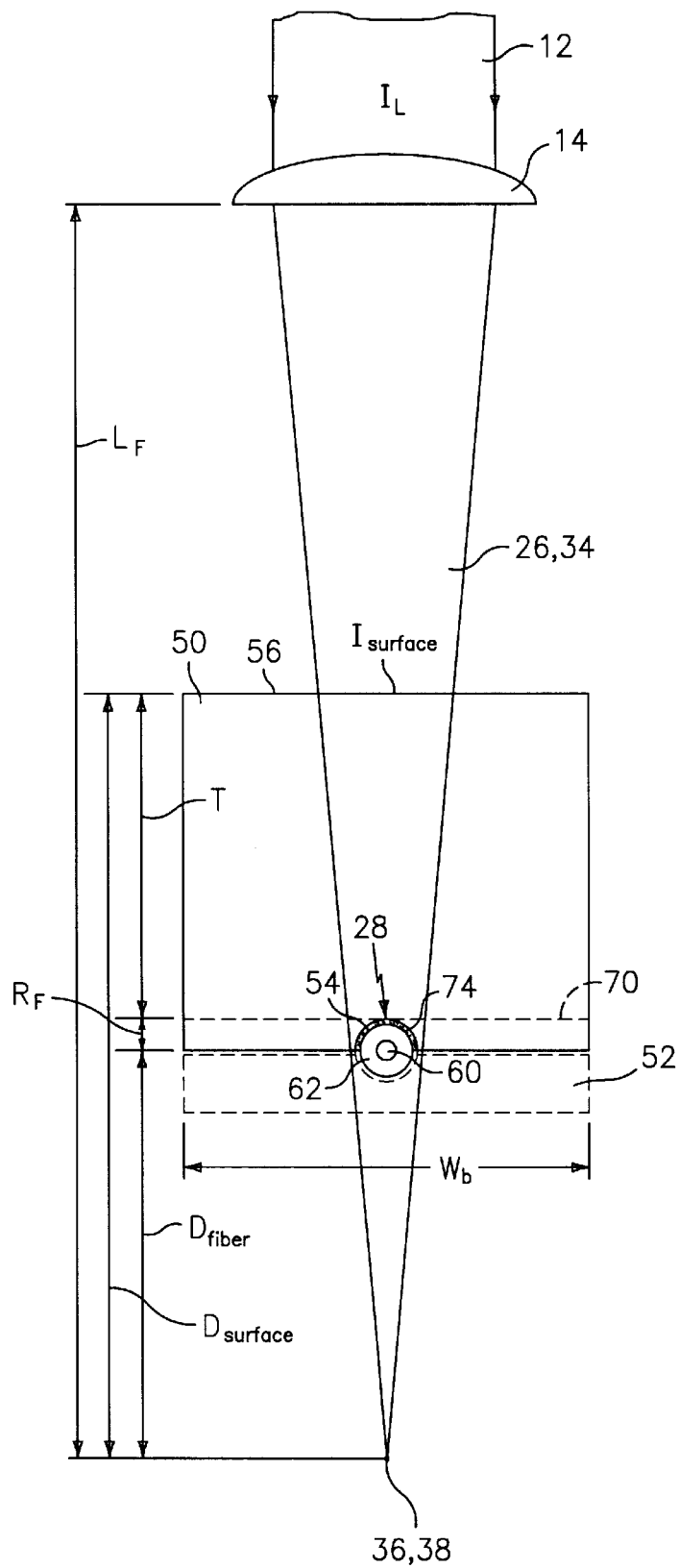
FIG. 3 is a side view of FIG. 2 showing the focussing of writing beams, in accordance with the present invention.

Referring to FIG. 2 of the present invention, an interface medium 50, e.g., a glass block, which is adjacent to and may be in contact with the fiber 28. The block 50 has a length L of about 1 cm, a thickness T of about 1–10 mm and a width Wb (side view) of about 4 cm (FIG. 3). Other dimensions for the block 50 may be used. Further, the block 50 has an outer surface 56 (that the writing beams 26,34 are incident on) that is optically flat.

The block 50 is made of a material that is substantially transparent to the wavelength of the writing beams 26,34 (e.g., Ultra Violet (UV) light), such as silica SiO$_2$ (e.g., fused silica, synthetic fused silica, fused quartz, synthetic quartz) or the like, such as Part No. PW-0643-UV made by CVI Corp. Other glasses or materials that are substantially transparent to the wavelength of the writing beams 26,34 may be used for the block 50. The amount of transparency (or optical attenuation) of the block 50 is determined by the thickness T and the material properties of the block 50. The acceptable amount of transparency is determined by the amount of optical attenuation that can be tolerated for a given application.

The block 50 may also have a refractive index that substantially matches that of the fiber 28. It is not required for the block 50 to be index-matching; however, if it is not, the angle of the writing beams 26,34 would change as they pass from the block 50 to the fiber 28 and would need to be accounted for in the grating writing procedure.

Also, a high intensity interference pattern in the fiber 28 may be formed if the focal lines 36,38 are focussed on or near the fiber 28 and/or if the laser intensity of the writing beams 26,34 is increased.

Referring to FIG. 3, the block 50 may have a side view cross-section that has a semicircular section 74 that substantially matches the shape of the fiber 28. Alternatively, the block 50 may have a flat bottom, as indicated by the dashed lines 70. Other shapes for the block may also be used. Also, there may be a lower block 52 below the fiber 28 having a matching clam-shell geometry to surround the fiber 28. Alternatively, the blocks 50,52 may be a single block with a hole in it that fiber 28 is inserted through.

Also, an intermediate material 54 may be disposed between and in contact with the block 50 and the fiber 28 to fill any air gaps between the block 50 and the fiber 28. The intermediate material 54 is substantially transparent to the wavelength of the writing beams 26,34 and has a refractive index that substantially matches that of the fiber 28 and the block 50, such as a UV transparent index-matching oil or gel, such as an oil by Cargile, Part No. 50350, or a soft UV polymer 54, such as Teflon® AF, by Dupont. Thus, the material 54 makes the interface between the block 50 and the fiber 128 substantially transparent to the writing beams 26,34. Also, as discussed hereinbefore, the amount of transparency is determined by the amount of optical attenuation that can be tolerated for a given application.

The intermediate material 54 may also be used in the event that the lower surface 58 of the block 50 and/or the outer surface (cladding) of the optical fiber 28 is not optically flat (along the longitudinal axis of the fiber). Typically, the outer surface (cladding) of the fiber 28 will be substantially optically flat.

Also, it is not required that the refractive index (or index) of the intermediate material 54 match the index of the block 50 or the index of the fiber 28. However, the rougher the surface 58 or the surface of the fiber 28, the closer the index-matching is required to be, as is discussed in copending U.S. patent application, Ser. No. (CC-0130), entitled "Method and Apparatus for Forming a Tube-Encased Bragg Grating", filed contemporaneously herewith, and which is hereby incorporated by reference.

Alternatively, the block 50 may be in direct contact with the fiber 28 without the intermediate material 54 in between.

Referring to FIG. 3, we have found that by using the block 50 having a minimum thickness T allows for the writing beams 26,34 to have a high intensity interference pattern at the fiber 28 while setting the intensity at the air-to-glass interface to be low enough to avoid damage (e.g., ablations) at the air-to-glass interface surface 56. The thickness T of the block 50 is determined by the focal length Lf of the lens 14, the intensity of the input beam 12, and the desired intensity Ifiber of the beams 26,34 at the fiber 28 and the desired intensity Isurface of the beams 26,34 at the air-to-glass interface 56.

In general, the equation for the intensity ID of a focussed beam at a given distance D from the focal point is as follows:

$$I_D = I1 * Lf / D \quad \text{Eq. 1}$$

where Lf is the focal length of the lens; I1 is the laser intensity (energy/area) of the input beam on a cylindrical focussing lens, D is an arbitrary distance from the focal point and $I_D$ is the intensity of the focussed beam at the location D along the focussed beam.

Rearranging Eq. 1 gives the distance D from the focal point of the beam where a given intensity $I_D$ exists, as follows:

$$D = I1 * Lf / I_D \quad \text{Eq. 2}$$

Thus, the distance Dfiber from the focal points (or lines) 36,38 to the center of the fiber 28 for a given desired intensity Ifiber of the beams 36,34 at the fiber 28 and the distance Dsurface from the focal point 26,38 to the air-to-glass surface 56 for a given desired intensity Isurface of the beams 26,34 at the air-to-glass interface 56 can be determined as follows:

$$\text{Dfiber} = I1 * Lf / \text{Ifiber} \quad \text{Eq. 3}$$

$$\text{Dsurface} = I1 * Lf / \text{Isurface} \quad \text{Eq. 4}$$

Accordingly, the thickness T of the medium 50 from the upper surface of the fiber 28 to the air-to-glass interface surface 56 can then be determined by the relation:

$$T = \text{Dsurface} - \text{Dfiber} - Rf \quad \text{Eq. 5}$$

where Rf is the radius of the fiber 28 which is small (about 63 microns) plus the thickness of the intermediate material 54 (if used), which, when compared to the relative value of the thickness T (e.g., in cm), can be typically be ignored for this calculation without sacrificing accuracy.

As discussed hereinbefore, an example of a high intensity grating exposure of an optical fiber is to have a minimum beam intensity Ifiber in the fiber 28 of about 800 mJ/cm$^2$. Also, an example of the maximum allowable intensity Isurface at the air-to-glass interface 56 to avoid surface damage is about 600 mJ/cm$^2$ (depending on the surface quality of the glass). Other intensities may be used if desired.

Thus, for a laser with an input power I1 to the lens 14 of 300 mJ/cm$^2$, a focal length Lf of 50 cm, and Ifiber=800 mj/cm$^2$ and Isurface=600 mJ/cm$^2$, the distance Dfiber from the focal point 36,38 to the center of the fiber 28, and the distance Dsurface from the focal point 36,38 to the air-to-glass surface 56 can be determined from Eqs. 4,5 as follows:

$$\text{Dfiber} = 300 * 50/800 = 18.7 \text{ cm}$$

$$\text{Dsurface} = 300 * 50/600 = 25 \text{ cm}$$

The thickness T of the medium 50 is determined from Eq. 5 as follows:

$$T = 25 - 18.7 = 6.3 \text{ cm}$$

Further, for any of the embodiments shown herein, instead of the fiber 28 passing through the block 50, the fiber 28 may be single-ended, i.e., only one end of the fiber 28 exits the block 50. In that case, one end of the fiber 28 would be at or prior to the exit point of the fiber 28 from the block 50. Also, the term "tube" as used herein may also mean a block of material having the properties described herein.

If desired, the fiber 28 may be hydrogen loaded prior to writing the grating to provide higher reflectivity and/or faster writing time, such as is discussed in U.S. Pat. No. 5,235,659, entitled "Method of Making An Article Comprising An Optical Fiber", to Atkins et al. Alternatively, the fiber 28 may have a high photosensitivity, e.g., high germanium doping of the fiber core, to provide a similar effect. However, neither hydrogen loading nor highly photosensitive fiber is required to write the grating 40 in the fiber 28 with the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What is claimed is:

1. An apparatus for impressing a grating in an optical waveguide, comprising:

a photosensitive optical waveguide;

an interface medium, disposed adjacent to said waveguide;

means for providing a pair of focussed writing beams having a predetermined wavelength capable of writing a Bragg grating in said waveguide;

said writing beams being incident on a surface of and passing through a portion of said interface medium, and said beams intersecting and interfering at a predetermined region of said waveguide;

said surface of said interface medium being optically flat; and said writing beams having an intensity at said waveguide of greater than a predetermined high intensity sufficient to cause surface damage to said waveguide in the absence of said medium and said medium having a predetermined thickness such that the intensity of said writing beams at said surface of said medium is less than a predetermined surface damage intensity such that surface damage does not occur on said medium and on said waveguide when said writing beams are writing said grating.

2. The apparatus of claim 1 further comprising an intermediate material between said medium and said waveguide.

3. The apparatus of claim 2 wherein said intermediate material is substantially transparent to said wavelength of said writing beams.

4. The apparatus of claim 2 wherein said intermediate material has a refractive index that substantially matches the refractive index of said waveguide and said interface medium.

5. The apparatus of claim 2 wherein said intermediate material comprises an oil.

6. The apparatus of claim 2 wherein said intermediate material comprises a polymer.

7. The apparatus of claim 1 wherein each of said writing beams is focussed to a line near said waveguide.

8. The apparatus of claim 1 wherein said waveguide comprises an optical fiber.

9. The apparatus of claim 1 wherein said wavelength of said writing beams is in the ultraviolet range.

10. The apparatus of claim 1 wherein said surface damage intensity is about 1500 mjoules/cm$^2$.

11. The apparatus of claim 1 wherein said high intensity is about 500 mjoules/cm$^2$.

12. A method for making a Bragg grating, comprising the steps of:

obtaining a photosensitive optical waveguide;

placing an interface medium adjacent to said waveguide;

simultaneously providing a pair of focussed writing beams having a predetermined wavelength capable of writing a Bragg grating in said waveguide;

said writing beams being incident on a surface of and passing through a portion of said interface medium, and said beams intersecting and interfering at a predetermined region of said waveguide;

said surface of said interface medium having being optically flat; and said writing beams having an intensity at said waveguide of greater than a predetermined high intensity sufficient to cause surface damage to said waveguide in the absence of said medium and said medium having a predetermined thickness such that the intensity of said writing beams at said surface of said medium is less than a predetermined surface damage intensity such that surface damage does not occur on said medium and on said waveguide when said writing beams are writing said grating.

13. The process of claim 12 further comprising an intermediate material between said medium and said waveguide.

14. The process of claim 13 wherein said intermediate material is substantially transparent to said wavelength of said writing beams.

15. The process of claim 13 wherein said intermediate material has a refractive index that substantially matches the refractive index of said waveguide and said interface medium.

16. The process of claim 13 wherein said intermediate material comprises an oil.

17. The process of claim 13 wherein said intermediate material comprises a polymer.

18. The process of claim 12 wherein each of said writing beams is focussed to a line near said waveguide.

19. The process of claim 12 wherein said waveguide comprises an optical fiber.

20. The process of claim 12 wherein said wavelength of said writing beams is in the ultraviolet range.

21. The process of claim 12 wherein said surface damage intensity is about 1500 mjoules/cm$^2$.

22. The process of claim 12 wherein said high intensity is about 500 mjoules/cm$^2$.

* * * * *